United States Patent [19]
Kiribayashi

[11] Patent Number: 5,916,290
[45] Date of Patent: Jun. 29, 1999

[54] AIRBAG DEVICE HAVING COMBINED FAULT DIAGNOSIS AND TYPE SIGNALING INDICATOR

[75] Inventor: Shinichi Kiribayashi, Anjou, Japan

[73] Assignee: Nippondenso Co., Ltd., Kariya, Japan

[21] Appl. No.: 08/950,784

[22] Filed: Oct. 15, 1997

Related U.S. Application Data

[63] Continuation of application No. 08/449,539, May 24, 1995, abandoned.

[30] Foreign Application Priority Data

May 26, 1994 [JP] Japan .................................... 6-112729

[51] Int. Cl.$^6$ .................................................. B60R 21/16
[52] U.S. Cl. ............................... 701/45; 701/32; 701/35; 340/438; 307/10.2
[58] Field of Search ........................... 701/29, 30, 31, 701/32, 33, 34, 35, 45, 47; 280/735, 728.2; 180/287; 307/10.1, 10.2, 10.5; 340/426, 438

[56] References Cited

U.S. PATENT DOCUMENTS

| | | |
|---|---|---|
| 4,359,715 | 11/1982 | Langer et al. ............................. 280/735 |
| 4,398,172 | 8/1983 | Carroll et al. ............................. 340/942 |
| 4,758,835 | 7/1988 | Rathmann et al. ................ 340/825.31 |
| 4,958,851 | 9/1990 | Behr et al. ................................. 280/735 |
| 5,019,747 | 5/1991 | Morita et al. ............................. 315/157 |
| 5,164,901 | 11/1992 | Blackburn et al. ................ 364/424.05 |

FOREIGN PATENT DOCUMENTS

| | | |
|---|---|---|
| 61-253512 | 11/1986 | Japan . |
| 63-207755 | 8/1988 | Japan . |
| 3-026653 | 3/1991 | Japan . |
| 3217356 | 9/1991 | Japan . |
| 4-051849 | 4/1992 | Japan . |
| 5-5092 | 2/1993 | Japan . |
| 5-278560 | 10/1993 | Japan . |

*Primary Examiner*—Tan Q. Nguyen
*Attorney, Agent, or Firm*—Pillsbury Madison & Sutro LLP

[57] ABSTRACT

An electronic control unit in an airbag device generates a data signal for identifying a type of control unit and outputs the data signal. The output data signal is received by a light emitting diode causing the light emitting diode to turn on and off responsive to the data signal. It is possible to easily identify whether the electronic control unit is correctly installed in a vehicle even after the airbag device is mounted in the vehicle, by detecting the variation of the light emitting state of the diode by a photo sensor or the like.

10 Claims, 2 Drawing Sheets

FIG. 2A IG. SW.
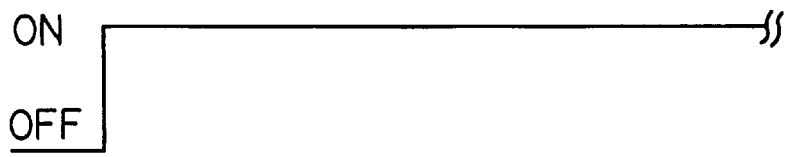
FIG. 2B WARN. DEVICE
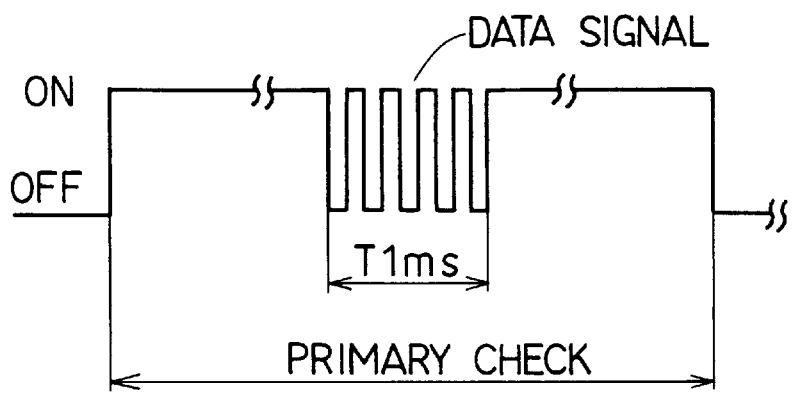
FIG. 3A IG. SW.
FIG. 3B WARN. DEVICE
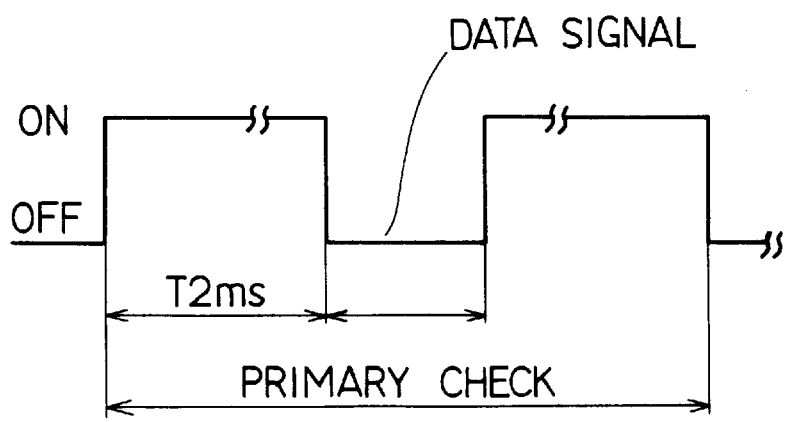

AIRBAG DEVICE HAVING COMBINED FAULT DIAGNOSIS AND TYPE SIGNALING INDICATOR

This is a continuation of application Ser. No. 08/449,539, filed on May 24,1995.

CROSS REFERENCE TO RELATED APPLICATION

This application is based upon and claims priority from Japanese Patent Application No. Hei. 6-112729 filed May 26, 1994, the contents of which are incorporated herein by reference.

BACKGROUND OF THE INVENTION

1. Field of the Invention

The present invention relates to an airbag device which protects a vehicle passenger from shock when a vehicle collision has occurred.

2. Related Art

An airbag device that uses an inflatable airbag to soften shock applied to a vehicular passenger in the event of a vehicle collision is well-known. In such an airbag device, an electronic control unit is used to deploy the airbag. The electronic control unit determines the occurrence of a vehicle collision based on a signal output from a deceleration sensor which is installed inside or outside of the electronic control unit and which detects deceleration when the vehicle collision has occurred. More specifically, the electronic control unit determines the occurrence of the vehicle collision by comparing the detected deceleration with a predetermined value. The predetermined value is preset and stored in the electronic control unit in accordance with the type of vehicle on which the airbag device is mounted or the attachment position of the sensor and electronic control unit.

Because the electronic control unit stores the different predetermined values, an unsuitable electronic control unit may be installed in a particular vehicle. Because the same housings or casings are used for various types of the airbag devices to reduce their cost, external appearances of the electronic control units are usually substantially similar adding to the possibility of installing an unsuitable device in a vehicle. To avoid such problem, a conventional electronic control unit includes, for example, an identification on its housing. Operators select a suitable electronic control unit based on this indentification, and they install the selected electronic control unit in the vehicle. However, there is no guarantee that the operators will not make a mistake with regard to selection of the appropriate electronic control unit.

If an unsuitable electronic control unit is selected and installed in the vehicle, the airbag device can not inflate its airbag at the proper time because the predetermined value stored in the electronic control unit for determining the vehicle collision does not match the vehicle in which the electronic control unit is installed.

To avoid such an undesirable situation, conventionally, the following measures are adopted. The electronic control unit outputs an identification signal from its output terminal, and the identification signal is input to an identification apparatus connected to the output terminal. The identification apparatus determines, based on the identification signal, whether the electronic control unit is correct or not, and shows the result.

However, in the conventional airbag device, there is a problem in that the flexibility concerning the configuration of the electronic control unit and a mounting position of the electronic control unit on the vehicle is limited. That is, because the identification apparatus must be connected to the output terminal of the electronic control unit for identifying the type of the electronic control unit, the control unit must be mounted on the vehicle so that the identification apparatus can be easily connected to the output terminal.

Furthermore, if the output terminal is not provided in the electronic control unit, it is difficult to determine whether an electronic control unit, which is suitable for the vehicle, is installed after the airbag device has mounted on the vehicle. For example, in an airbag device where the electronic control unit is installed in a steering unit along with an airbag and inflator for inflating the airbag, the electronic control unit usually does not provide the output terminal.

SUMMARY OF THE INVENTION

In view of the above problems of the prior art, it is an object of the present invention to provide an airbag device which can easily identify whether an installed electronic control unit is suitable for the vehicle after an airbag device has been installed in the vehicle.

An airbag device according to an embodiment of the present invention comprises an electronic control unit which stores control data, the control data being preset in accordance with a type of a vehicle, and an airbag adapted to be inflated when the electronic control unit detects an occurrence of a vehicle collision based on the control data, wherein the electronic control unit includes an output device outputting a data signal corresponding to the stored control data to identify a type of the electronic control unit, and a light emitting device varying its light emitting state responsive to the data signal from the output device.

The variation of the light emitting state is detected by, for example, a photosensor. The type of the electronic control unit can be identified based on an output signal from the photo sensor. Therefore, even after the electronic control unit or the airbag device is mounted on the vehicle, it is possible to simply and accurately identify whether the electronic control unit is suitable for the vehicle.

The airbag device can further comprise a diagnosis circuit for diagnosing a fault of the electronic control unit, and a device allowing performance of the fault diagnosis by the diagnosis circuit, wherein the light emitting device emits a light to show that the fault diagnosis is being performed by the diagnosis circuit, and the light emitting device varies the light emitting state responsive to the data signal when the light is emitted to show that the unit is under fault diagnosis.

Due to the above structure, the light emitting device shows the unit to be under fault diagnosis and indicates a type of the electronic control unit. Therefore, it is possible to make the structure of the airbag device according to the present invention simple. If the light emitting device turns the light on and off at high speed to vary the light emitting state, it is imperceptible to the vehicle passenger and it does not cause the vehicle passenger to have an uncertain feeling.

Moreover, if the electronic control unit in the airbag device is installed in a pad of a steering wheel, it is difficult to provide an external connection terminal for of the electronic control unit. Thus, it is impossible to simply and accurately identify the type of the electronic control unit. However, according to present invention, the type of the electronic control unit can be simply and accurately identified based on the detected light emitting state.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 2A is a graph illustrating an on/off state of an ignition switch;

FIG. 2B is a graph illustrating an identification data signal output from a central processing unit according to the first embodiment;

FIG. 3A is a graph illustrating a on/off state of an ignition switch; and

FIG. 3B is a graph illustrating an identification data signal output from a central processing unit according to the second embodiment;

DETAILED DESCRIPTION OF THE PREFERRED EMBODIMENTS

Figure 1:
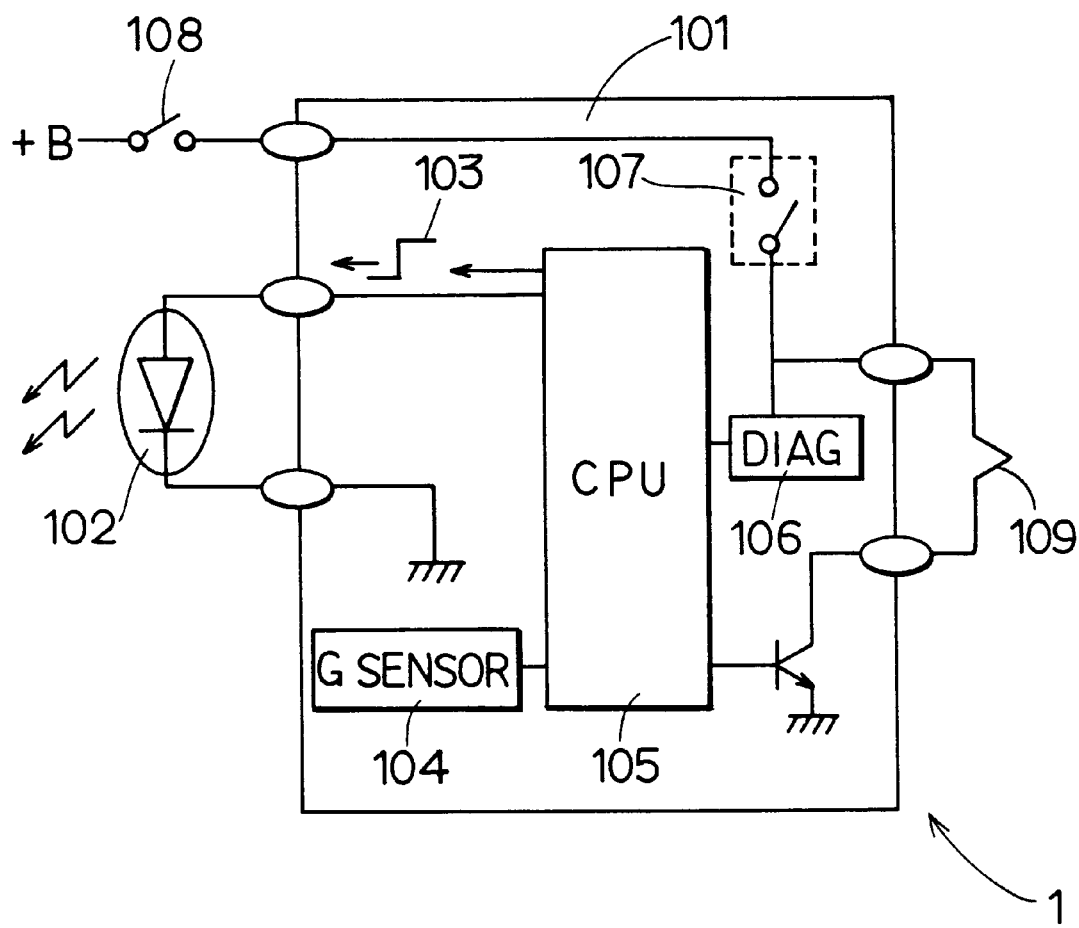
FIG. 1 is a circuit diagram illustrating the structure of an electronic control unit of an airbag device according to a preferred embodiment of the present invention.

A preferred embodiment of the present invention will be described in detail with reference to the attached figures.

FIG. 1 is a circuit diagram illustrating the structure of an electronic control unit 101 of an airbag device 1 according to the present invention. The structure of the airbag device 1 will be explained hereinafter.

The airbag device 1 comprises an electronic control unit 101 which determines an occurrence of a vehicle collision, a squib 109 that is energized to cause an inflator (not shown) to generate inflation gas when the vehicle collision has been detected, and a warning device 102 showing the result of a fault diagnosis with regard to a central processing unit 105 or the like.

The squib 109 is energized to cause the inflator to generate the inflation gas on the vehicle collision. The inflation gas generated from the inflator inflates an airbag (not shown) installed in front of a vehicular passenger. The inflated airbag protects the vehicular passenger from impacts. The warning device 102 is a light emitting device, such as a light emitting diode. The warning device 102 is disposed in an instrument panel in front of a driver's seat. Alternatively, if the airbag device 1 is installed in a pad of a steering wheel along with the electronic control unit 101, the warning device 102 is buried in the pad at a point where the top surface of the warning device 102 is exposed to the passenger compartment. It is difficult to provide an external connection terminal for outputting a control unit identification signal, when the electronic control unit is installed in the pad of the steering wheel. However, according to the present embodiment, because the type of the electronic control unit 101 can be determined based on the light emitting state of the warning device 102, it is possible to simply and accurately identify whether the electronic control unit 101 is installed correctly or not.

The electronic control unit 101 includes a deceleration sensor 104 which detects deceleration generated by the vehicle collision, a central processing unit 105 which determines the occurrence of the vehicle collision based on the detected deceleration by the deceleration sensor 104, and a diagnosis circuit 106 which diagnoses faults in the electronic control unit 101 or of the squib 109. Reference numeral 107 indicates a fail-safe sensor which is a mechanical deceleration sensor.

The operation of the embodiment described above will be explained with reference to FIGS. 2A and 2B.

As shown in FIGS. 2A and 2B, the central processing unit 105 of the electrical control unit 101 detects that an ignition switch 108 is turned on by the vehicular passenger, and at that moment the diagnosis circuit 106 performs the fault diagnoses or primary check of the electronic control unit 101 and squib 109. Then, in order to notify the vehicular passenger that the primary check are being conducted, the warning device emits light for a predetermined period. As a result of the primary check, if any fault of the electronic control unit 101 or squib 109 is detected by the diagnosis circuit 106, the warning device 102 continues to emit the light to signify the detection of the fault.

While the diagnosis circuit 106 is performing the primary check, the central proseccing unit 105 outputs a data signal 103 to the warning device 102 for identifying the type of the electronic control unit 101. Different data signals are respectively preset corresponding to different types of electronic control units. An example of the data signal 103 is shown in FIG. 2B. In FIG. 2B, the data signal 103 is a code signal of eight bits, and is output for a predetermined period T1. The warning device 102 receives the data signal 103, and makes the light turn on and off at a high speed for the predetermined period T1.

The central processing unit 105 can output the data signal 103 at any time, as long as the warning device 102 emits the light to show that the electronic control unit 101 is under the primary check. That is, the central processing unit 105 can output the data signal 103 immediately after the primary check is started, or immediately before the primary check is terminated. Furthermore, if it does not matter that the vehicular passenger may notice a part of the data signal 103 turned on and off at a high speed, the central processing unit 105 may output the data signal 103 separately from the primary check.

The predetermined period T1 is set to about a few milliseconds (for example, one millisecond). This is because the flickering of the light emitting state can be prevented when the light of the warning device 102 turns on and off with the data signal 103. The data signal 103 can be transmitted as a serial signal from the central processing unit 105 to the warning device 102. When identifying whether the electronic control unit is correctly installed in the vehicle, a light receiving apparatus, such as a photo sensor 200, is utilized to catch the light from the warning device 102, which is imperceptible to the human eye and turns on and off at a high speed based on the data signal 103.

The effect of the embodiment will be explained hereinafter.

In the airbag device according to the present embodiment, the data signal 103 is output to the warning device 102 which the conventional airbag device provides from the moment that the ignition switch 108 is turned on. Thus, an output terminal outputting a signal for identification of the electronic control unit type is not needed in the present embodiment.

The warning device 102 emits light to indicate that the primary check is being performed, during the primary check the light of the warning device 102 is turned on and off at a high speed for an extremely short period, and the type of the electronic control unit 101 is determined based on the variation of the light. The determination of the electronic control unit 101 may be performed at least one time after the airbag device is mounted on the vehicle. According to the present embodiment, the variation of the light emitting state for determination of the electronic control unit 101 is too fast for the vehicular passenger to notice and appears only for an extremely short period (for example, less than a few milliseconds). Thus the variation of the light emitting state is not perceptible to the vehicular passenger. Consequently, it does not cause the vehicle passenger to have an uncertain feeling about the operability of the airbag system, even if the light emitting state varies every time the ignition switch 108 is turned on.

In the airbag device according to the present embodiment, the electronic control unit can be installed in the pad of the steering wheel along with the airbag and the inflator or the like, or it can be disposed on the compartment floor of the vehicle.

The present invention is not limited to the embodiment described above but can be changed in various ways as described below.

For example, the data signal 103 which the central processing unit 105 outputs for discriminating the type of the electronic control unit during the primary check does not need to be a code signal of eight bits. An example of another suitable data signal will be explained with reference to FIGS. 3A and 3B.

When the central processing unit 105 detects that the ignition switch 108 is turned on, it starts to perform the primary check and the warning device 102 emits light. After the warning device 102 emits the light and a predetermined period T2 has passed, as shown in FIG. 3B, a pulse signal is output from the central processing unit 105. The predetermined period T2 is preset to a different value according to the type of the electronic control unit 101. The light of the warning device 102 turns on and off responsive to the pulse signal. When identifying whether the installed electronic control unit is installed correctly, an apparatus for determining the type of the electronic control unit detects when the light of the warning device 102 turns off after emitting light to show that the unit is under the primary check. The period is preset corresponding to the type of the electronic control unit and thereby it is possible to easily identify whether the electronic control unit 101 is installed correctly. Moreover, such a pulse signal may be output multiple times from the central processing unit at specified intervals which are preset according to the type of the electronic control unit 101.

The present invention has been described in connection with what are presently considered to be the most practical and preferred embodiments, however, the invention is not meant to be limited to the described embodiments, but rather is intended to include all modifications and alternative arrangements included within the spirit and scope of the appended claims.

What is claimed is:

1. An airbag device comprising:
   an electronic control unit which is mounted on a vehicle and which stores control data, said control data being preset in accordance with a type of said vehicle such that different types of vehicles have different control data associated therewith;
   an inflator for generating gas responsive to an inflation signal from said electronic control unit;
   an airbag which is inflated by said gas provided by said inflator;
   a diagnosis circuit for diagnosing a fault of said electronic control unit responsive to an ignition switch of said vehicle being turned on; and
   a light emitting element disposed in said vehicle so that a passenger can perceive a light emitting state of said light emitting element for emitting light indicating that a fault diagnosis is being performed by said diagnosis circuit, wherein said electronic control unit provides, responsive to said ignition switch being turned on, a data signal corresponding to said control data, which identifies a type of said electronic control unit, to said light emitting element only when said light emitting element is in a process of emitting light indicating that said fault diagnosis is being performed, and
   wherein said light emitting element varies its light emitting state responsive to said data signal from said electronic control unit.

2. An airbag device according to claim 1, wherein said data signal indicative of a type of said electronic control unit is a pulse signal having at least one pulse, and therein said data signal is received by said light emitting element responsive to elapsing of a predetermined period after said diagnosis circuit begins performing a fault diagnosis, and
   wherein said light emitting element turns off responsive to said pulse signal.

3. An airbag device according to claim 1, wherein said data signal is transmitted as a serial signal to said light emitting element, and
   wherein said light emitting element varies said light emitting state so that a light turns on and off at a speed substantially imperceptible to a human eye, responsive to said data signal from said electronic control unit.

4. An airbag device according to claim 1, said electronic control unit includes:
   a deceleration sensor for detecting a deceleration generated responsive to a vehicle collision having occurred and for outputting a detected signal responsive thereto; and
   a central processing unit for calculating a deceleration value based on said detected signal and for determining an occurrence of said vehicle collision by comparing said deceleration value with a predetermined value.

5. An airbag device according to claim 1, wherein said light emitting element is a light emitting diode.

6. An airbag device according to claim 1, wherein said vehicle includes a steering wheel and a pad disposed thereon and said electronic control unit is installed in said pad in said steering wheel.

7. An airbag device according to claim 1, wherein said light emitting element is installed in said pad of said steering wheel.

8. An airbag device according to claim 1, further comprising:
   a photo sensor detecting said variation of said light emitting state and outputting a variation signal representative thereof; and
   type determining unit determining a type of said electronic control unit based on said variation signal.

9. An airbag system comprising:
   an electronic control unit which stores control data, said control data being preset in accordance with a type of vehicle such that different types of vehicles have different control data associated therewith;
   an inflator for generating gas responsive to an inflation signal generated by said electronic control unit responsive to said electronic control unit determining an occurrence of a vehicle collision based on said control data;
   an airbag which is inflated by said gas generated by said inflator;
   a diagnosis circuit disposed in said electronic control unit for diagnosing a fault of said electronic control unit responsive to an ignition switch of said vehicle being turned on;

a steering wheel which has a pad for housing said electronic control unit, said inflator and said airbag;

a light emitting element buried in said pad so that a passenger can perceive a light emitting state of said light emitting element, for emitting light to inform said passenger that said diagnosis circuit is performing a fault diagnosis, wherein said electronic control unit provides, in response to detection of said ignition switch being turned on, a data signal corresponding to said control data, which identifies a type of said electronic control unit, to said light emitting element only when said light emitting element emits light to inform said passenger that said diagnosis circuit is performing said fault diagnosis, and wherein said light emitting element varies its light emitting state responsive to said data signal from said electronic control unit.

10. An electronic control unit which is mounted on a vehicle and which stores control data, said control data being preset in accordance with a type of said vehicle such that different types of vehicles have different control data associated therewith;

an inflator for generating gas responsive to an inflation signal generated by said electronic control unit responsive to said electronic control unit determining an occurrence of a vehicle collision based on said control data;

an airbag which is inflated by said gas generated by said inflator;

a diagnosis circuit for diagnosing a fault of said electronic control unit responsive to an ignition switch of said vehicle being turned on;

a light emitting element dispose din said vehicle so that a passenger can perceive a light emitting state of said light emitting element, for emitting light to inform said passenger that said diagnosis circuit is performing a fault diagnosis, wherein said electronic control unit provides, in response to detection of said ignition switch being turned on, a data signal corresponding to said control data which identifies a type of said electronic control unit, to said light emitting element only when said light emitting element emits light to inform said passenger that said diagnosis circuit is performing said fault diagnosis, and wherein said light emitting element turns on and off at a speed substantially imperceptible to a human eye, responsive to the data signal from said electronic control unit.

* * * * *